United States Patent [19]
Zwick

[11] Patent Number: 5,161,181
[45] Date of Patent: Nov. 3, 1992

[54] AUTOMATIC NUMBER IDENTIFICATION BLOCKING SYSTEM

[75] Inventor: Nicholas Zwick, Denville, N.J.

[73] Assignee: Dialogic Corporation, Parsippany, N.J.

[21] Appl. No.: 463,298

[22] Filed: Jan. 10, 1990

[51] Int. Cl.⁵ .................... H04M 1/57; H04M 3/50
[52] U.S. Cl. ........................ 379/67; 379/88; 379/142; 379/213; 379/245
[58] Field of Search ............ 379/67, 88, 142, 196, 379/197, 201, 211, 212, 213, 246, 247, 249, 127, 245

[56] References Cited

U.S. PATENT DOCUMENTS

| | | | |
|---|---|---|---|
| 3,111,561 | 11/1963 | Dunning | 379/82 |
| 4,696,028 | 9/1987 | Morganstein et al. | 379/88 |
| 4,747,124 | 5/1988 | Todd | 379/67 |
| 4,797,910 | 1/1989 | Daudelin | 379/67 |
| 4,797,911 | 1/1989 | Szlam et al. | 379/67 |
| 4,827,500 | 5/1989 | Binkerd et al. | 379/88 |
| 4,847,890 | 7/1989 | Solomon et al. | 379/67 |
| 4,852,149 | 7/1989 | Zwick et al. | 379/67 |
| 4,922,519 | 5/1990 | Daudelin | 379/67 |
| 4,935,956 | 6/1990 | Hellwarth et al. | 379/112 |
| 4,942,598 | 7/1990 | Davis | 379/57 |
| 4,955,047 | 9/1990 | Morganstein et al. | 379/112 |
| 4,979,206 | 12/1990 | Padden et al. | 379/67 |
| 5,058,152 | 10/1991 | Solomon et al. | 379/67 |

FOREIGN PATENT DOCUMENTS 57-54492 3/1982 Japan.
59-86357 5/1984 Japan.

Primary Examiner—Thomas W. Brown
Attorney, Agent, or Firm—Michael B. Einschlag

[57] ABSTRACT

ANI Blocking System (ABS) logically interfaces between a calling party and a called party in a telephone network which provides CallerID and CallerID blocking. The ABS automatically: (1) accepts a call from the calling party; (2) places a call to the called party; and (3) connects the called party with the calling party.

21 Claims, 2 Drawing Sheets

AUTOMATIC NUMBER IDENTIFICATION BLOCKING SYSTEM

TECHNICAL FIELD OF THE INVENTION

The present invention pertains to an automated telephone communications system for use in telephone communications environments and, in particular, for use in telephone communications environments wherein origination information, for example, calling party identification in the form of automatic number identification (ANI), is signalled; the automated telephone communications system being particularly adapted for use in blocking transmission of the origination information to a called party.

BACKGROUND OF THE INVENTION

A telephone communications environment, such as, for example, a network signalling environment or a customer premises equipment (CPE) environment, often interacts with signals in which origination information, for example, calling party identification in the form of automatic number identification (ANI), is signalled. For example, The Bell Telephone Company of Pennsylvania has a CallerID service wherein calling-number-identification is presented to a device at the called party's premises, letting the called party view the number before answering the call. A controversy has arisen in that allegations have been made that the CallerID service violates the privacy rights of callers and possibly endangers the lives of individuals who want to preserve their anonymity. For example, it has been stated by the Pennsylvania Office of Consumer Advocate that, "If you call an automobile dealership or insurance company [that has a device that records as well as displays callers' numbers] you have a friend for life."

As a result, there is a need for an automated telephone communications system which logically interfaces between a calling party and a called party in a telephone network which provides calling party identification and which provides a calling party identification blocking service. In such a telephone network which provides a calling party identification blocking service there is a need for an automated telephone communications system which automatically: (1) accepts a call from the calling party; (2) places a call to the called party; and (3) connects the called party with the calling party. Additionally, if the telephone network does not provide a calling party identification blocking service or if the called party does not subscribe to such a blocking service, there is a need for an automated telephone communications system which automatically: (1) accepts a call from the calling party; (2) obtains called party identification from the calling party; (3) places a call to the called party; and (4) connects the called party with the calling party.

SUMMARY OF THE INVENTION

Embodiments of the present invention advantageously satisfy the above-identified need in the art and permit calling parties to make calls within a telephone network which provides a calling party identification service such as, for example, CallerID service without having their telephone numbers disclosed to called parties.

In particular, a first set of embodiments of the present invention comprises an ANI Blocking System (ABS) which logically interfaces between a calling party and a called party in a telephone network which provides calling party identification blocking. The ABS automatically: (1) accepts a call from the calling party; (2) places a call to the called party; and (3) connects the called party with the calling party. In such an embodiment, the ABS interfaces with a telephone network, for example, with a local exchange, as customer premises equipment (CPE) of a CallerID blocking service provider and, in another such embodiment of the present invention, an ABS is interfaced into the telephone network at a tandem access point.

In a second set of embodiments of the present invention, for use in a telephone network which does not provide the blocking service or for use by a calling party who does not subscribe to such blocking service, the ABS automatically: (1) accepts a call from the calling party; (2) obtains called party identification from the calling party; (3) places a call to the called party; and (4) connects the called party with the calling party.

The first set of embodiments of the ABS are used in a telephone network which offers a CallerID blocking service to which a calling party subscribes. In this case, when a subscribing calling party makes a telephone call, the telephone network causes the call to be intercepted and routed to the ABS. When the call is transmitted to the ABS, the network also transmits the telephone number of the calling and the called party to the ABS. The ABS then uses the transmitted called party telephone number to initiate a separate call to the called party. In such an environment just as the telephone network transmitted the telephone number of the calling party to the ABS, now, the telephone network transmits the CallerID of the ABS to the called party instead of the telephone number or origination ID of the calling party. The ABS then connects the calling party to the called party and the calling party proceeds as if the call had been placed to the called party directly. Next, the ABS monitors both ends of the call to detect whether the calling party or the called party hangs up to determine whether the call has ended. At that point the ABS will terminate the call, i.e., go on-hook towards, the calling party and the called party, thereby tearing down the call. In this environment, the ABS comprises: (a) means for receiving a call from a calling party; (b) means for obtaining called party identification; (c) means for placing a call to the called party; (d) means for connecting the calling party and the called party; (e) means for detecting whether the calling party or the called party has terminated the call; and (f) means for terminating the call in the network when either the calling party or the called party has terminated the call.

The second set of embodiments of the ABS are used in a telephone network which does not offer a CallerID blocking service or, if such a blocking service is offered, a calling party does not subscribe thereto. In this case a calling party may still wish to have CallerID blocked or replaced on a call-by-call basis and the calling party first calls the ABS by dialing an access number When the call is received by the ABS, the ABS prompts the calling party to enter the telephone number of the called party, for example, by using dual tone multi-frequency (DTMF) or voice input. The ABS then uses the called party telephone number to initiate a separate call to the called party. In such an environment, just as the telephone network transmitted the CallerID of the calling party to the ABS, now, the telephone network transmits the CallerID of the ABS to the called party instead of the telephone number or origination ID of the calling party. The ABS then connects the calling party to the called party and the calling party proceeds as if the call had been placed to the called party directly. Next, the ABS monitors both ends of the call to detect whether the calling party or the called party hangs up to determine whether the call has ended. At that point the ABS will terminate the call, i.e., go on-hook towards, the calling party and the called party, thereby tearing down the call. In this environment, the ABS comprises: (a) means for receiving a call from a calling party; (b) means for prompting the calling party to transmit a called party identification and means for receiving and identifying such information; (c) means for placing a call to the called party; (d) means for connecting the calling party and the called party; (e) means for detecting whether the calling party or the called party has terminated the call; and (f) means for terminating the call in the network when either party has terminated the call.

In further embodiments of both set of embodiments of the present invention, the ABS receives the calling party or origination identification information and places it in a database for use as, for example, in billing the calling party for service such as, for example, for the CallerID Blocking in service, for providing information to governmental authorities in response to criminal investigations, and so forth.

BRIEF DESCRIPTION OF THE DRAWING

A complete understanding of the present invention may be gained by considering the following detailed description in conjunction with the accompanying drawing, in which.

DETAILED DESCRIPTION

Figure 1:
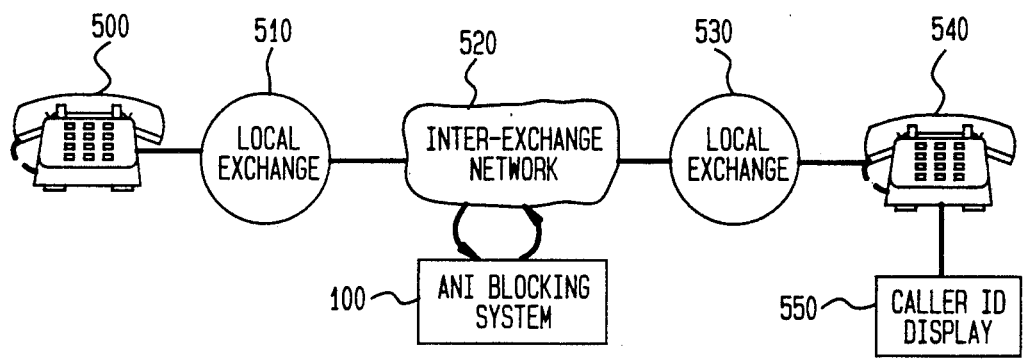
FIG. 1 shows, in pictorial form, the logical placement of an inventive ANI Blocking System (ABS) in a telephone network.

FIG. 1 shows the logical placement of ANI Blocking System 100 (ABS 100) in a telephone network. Specifically, calling party 500 and called party 540 are connected to local exchanges 510 and 530, respectively. Local exchanges 510 and 530 are interconnected through a network of inter-exchange carriers and inter-exchange switches which are collectively represented by inter-exchange network 520. Local exchange 510 to which calling party 500 is connected knows the telephone number of calling party 500. In the CallerID service offering, local exchange 510 passes the telephone number of calling party 500 through interexchange network 520 to local exchange 530. Local exchange 530, in turn, passes the telephone number of calling party 500 to called party 540 and to customer premises device 550 at the premises of called party 540. Further, customer premises equipment 550 can display and/or store the telephone number of calling party 500.

ABS 100 can be placed into the telephone network by interconnecting it at local exchange 510 or, as shown in FIG. 1, it may be interconnected at a tandem access point such as, for example, at inter-exchange network 520. In general, ABS 100 can operate in either of two modes. In its first mode of operation, ABS 100 is utilized in a telephone network which offers a CallerID blocking service to which a calling party subscribes. In such a telephone network, when calling party subscriber 500 makes a telephone call, the telephone network causes the call to be intercepted and routed to ABS 100. When the call is received by ABS 100, the network also sends the telephone number of calling party 500 and the telephone number of called party 540. ABS 100 uses the telephone number of called party 540 to initiate a separate call to called party 540. In such an environment, just as the telephone network transmitted the telephone number of calling party 500 to ABS 100, now, the telephone network transmits the CallerID of ABS 100 to called party 540 instead of the telephone number or origination ID of calling party 500. Then, ABS 100 connects calling party 500 to called party 540 and calling party 500 proceeds as if the call had been placed to called party 540 directly. ABS 100 monitors both ends of the call to detect whether calling party 500 or called party 540 hangs up to determine whether the call has ended. At that point ABS 100 will terminate the call, i.e., go on-hook towards, calling party 500 and called party 540, thereby tearing down the calls.

In its second mode of operation, ABS 100 is utilized in a telephone network which does not offer a CallerID blocking service or, if such a blocking service is offered, calling party 500 does not subscribe thereto. In this case calling party 500 may still wish to have CallerID blocked on a call-by-call basis and calling party 500 first calls ABS 100 by dialing an access number. When the call is received by ABS 100, ABS 100 prompts calling party 500 to enter the telephone number of called party 540, for example, by using dual tone multi-frequency (DTMF) or voice input. ABS 100 then uses the telephone number of called party 540 to initiate a separate call to called party 540. In such an environment, just as the telephone network transmitted the telephone number of calling party 500 to ABS 100, now, the telephone network transmits the CallerID of ABS 100 to called party 540 instead of the telephone number or origination ID of calling party 500. ABS 100 performs the same tasks for the remainder of the call as have been outlined above for the first mode of operation.

Figure 2:
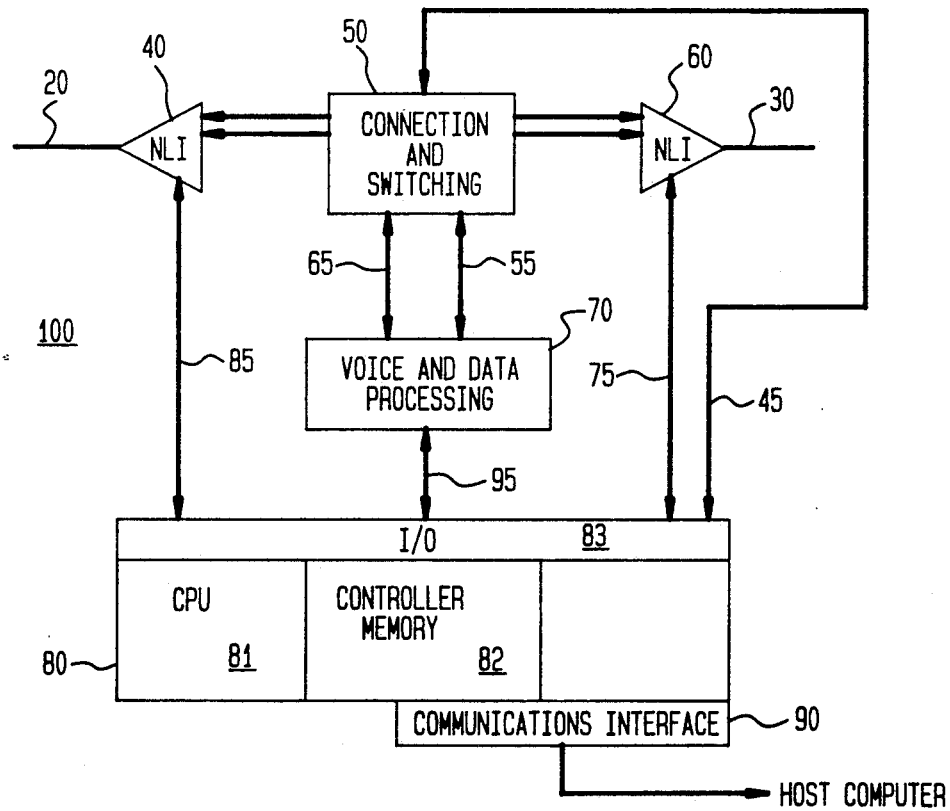
FIG. 2 shows a block diagram of an embodiment of the inventive ABS.

FIG. 2 shows a block diagram of ABS 100 fabricated in accordance with the present invention. In this embodiment, ABS 100 is connected by lines 20 to the public switched telephone network (PSTN) and by lines 30 to the PSTN. ABS 100 receives a telephone call signal Which is comprised of in-band network routing and/or origination information, for example, automatic numbering identification (ANI) and the telephone number of called party 540.

As shown in FIG. 2, ABS 100 is comprised of network line interface 40 (NLI 40). NLI 40 provides access over lines 20 from the PSTN to ABS 100. In accordance with the present invention, NLI 40 appears to the P to be physically identical to a CPE (customer premises equipment) such as, for example, a PBX or an ACD or to a telephone. Further, although NLI 40 may operate on an analog or digital basis, it must be capable of performing the following functions. It must: (1) recognize an incoming request for service from a calling party using the PSTN over lines 20 and be able to report same to controller 80 of ABS 100 over lines 85 and (2) acknowledge a request for service from the PSTN over lines 20 in response to commands transmitted thereto over lines 85 from controller 80. Note that in some embodiments, some of lines 20 may service a single party and/or others of lines 20 may service a multiplicity of parties by means of a multiplex scheme such as that used on a T1 digital carrier. Embodiments of NLI 40 are commercially available in the art. For example, in a preferred embodiment, one may utilize digital telephony interface DTI/124, DIALOG/41B, and MF/40, all of which are available from Dialogic Corporation, 300 Littleton Road, Parsippany, N.J. 07054.

As shown in FIG. 2, ABS 100 is further comprised of network line interface 60 (NLI 60). NLI 60 provides access over lines 30 from the PSTN to ABS 100. In accordance with the present invention, NLI 60 appears to the PSTN to be physically identical to a CPE such as, for example, a PBX or an ACD or to a telephone. Further, although NLI 60 may operate on an analog or digital basis, it must be capable of performing the following functions. It must: (1) make a request for service to the PSTN over lines 30 in response to commands transmitted thereto over lines 75 from controller 80; and (2) transmit a telephone number of a called party into the PSTN over lines 30 in response to commands transmitted thereto over lines 75 from controller 80. Note that in some embodiments, some of lines 30 may service a single party and/or others of lines 30 may service a multiplicity of parties by means of a multiplex scheme such as that used on a T1 digital carrier. Embodiments of NLI 60 are commercially available in the art. For example, in a preferred embodiment, one may utilize digital telephony interface DTI/124, DIALOG/41B, and MF/40, all of which are available from Dialogic Corporation, 300 Littleton Road, Parsippany, N.J. 07054.

As shown in FIG. 2, ABS 100 is further comprised of voice and data processing means 70 (VDPM 70). VDPM 70 provides the following functions. It: (1) generates digitized or synthesized progress tone output signals for transmission to: (a) NLI 40 over lines 65 for ultimate transmission to the PSTN over lines 20 in response to commands from controller 80 over lines 95 and (b) NLI 60 over lines 55 for ultimate transmission to the PSTN over lines 30 in response to commands from controller 80 over lines 95; (2) detects and decodes addressing such as, for example, telephone numbers, call progress signals, network routing and/or origination information, and/or other identification signals, including dual tone multi-frequency signals (DTMF) and multi-frequency tones (MF), which were received from the PSTN over lines 20 and transmitted to VDPM 70 over lines 65 or which were received from the PSTN over lines 30 and transmitted to VDPM 70 over lines 55 and transmits same to controller 80 over lines 95; (3) codes and transmits addressing such as, for example, telephone numbers, network routing and/or origination information, and/or other identification signals, including DTMF and MF, to NLI 60 over lines 55 in response to commands from controller 80 over lines 95 for ultimate transmission to the PSTN over lines 30; and (4) optionally, transmits audio announcements to the calling party through the PSTN. Embodiments of VDPM 70 are commercially available in the art. For example, in a preferred embodiment, one may utilize voice communication systems DIALOG/41B and MF/40 which are both available from Dialogic Corporation, 300 Littleton Road, Parsippany, N.J. Note that the specific number of VDPM's used in a particular embodiment depends on the number of parties one needs to handle.

As shown in FIG. 2, ABS 100 is further comprised of connection and switching means 50 (CSM 50). CSM 50 provides: (a) the function of connecting and switching, on an analog or digital basis, individual circuits in NLI 40 to individual voice and data processing circuits within VDPM 70 or to individual circuits within NLI 60 and (b) the function of connecting and switching, on an analog or digital basis, individual circuits in NLI 60 to individual voice and data processing circuits within VDPM 70, all in response to commands transmitted thereto over lines 45 from controller 80. Embodiments of CSM 50 are commercially available in the art. For example, in a preferred embodiment, one may utilize a portion of the DTI/124 referred to above to switch by means of time-division multiplex (TDM) switching. The DTI/124 permits switching between a T-1 digital telephony interface input which carries 24 telephone conversations and either an expansion bus which connects, in turn, to NLI 60 or to any of the voice processing circuits of VDPM 70.

Finally, as shown in FIG. 2, ABS 100 further comprises controller 80. Controller 80, as should be evident from the above, manages and coordinates the activity of the components of ABS 100. Controller 80 comprises the following parts: a central processing unit 81 (CPU 81), memory 82, and I/O interfaces 83. In addition, controller 80 may optionally further comprise a local data base (not shown) and/or communications interface 90 for communication with an external computer which itself may have a data base. The local data base may be accessed on the basis of network routing and/or origination information such as, for example, ANI information and/or DNIS information, for storing information pertaining to the received network routing and/or origination information. Communications interface 90 provides communication of various information to an external host computer (not shown) which itself may have a data base. Specifically, in an embodiment wherein ABS 100 is not comprised of a local data base, the information transmitted over communications interface 90 may include the ANI and/or the DNIS information in a predetermined format. In a preferred embodiment of the present invention, controller 80 is an IBM compatible personal computer (PC) or similar unit which is commercially available from many sources. In addition, an embodiment of communications interface 90 may be obtained commercially from many sources such as from DCA of Alpharetta, Georgia, AST of Irvine, Calif. and so forth.

Figure 3:
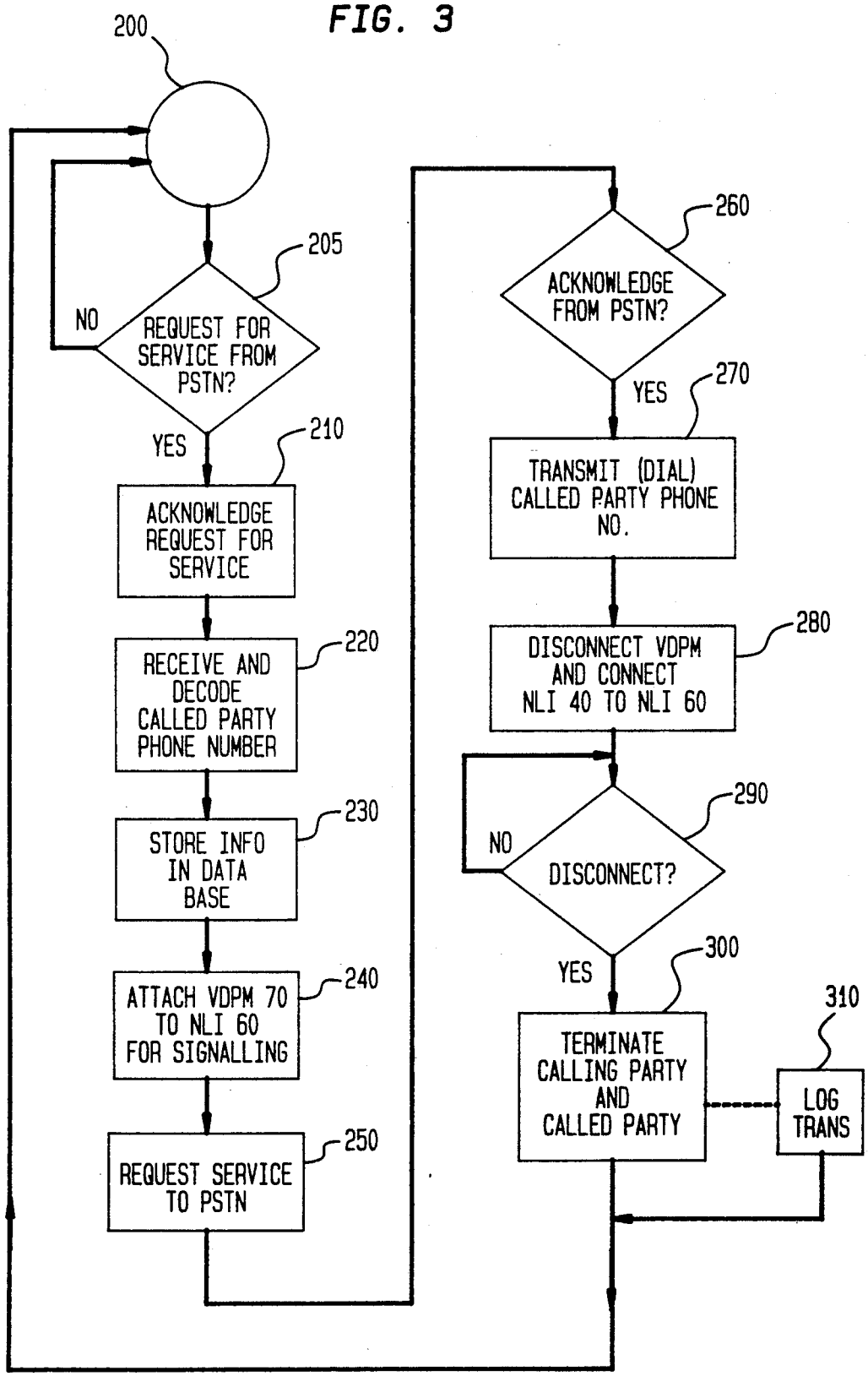
FIG. 3 shows a flow chart of the operation of an embodiment of the inventive ABS in handling a telephone call from a calling party to a called party.

The following describes how ABS 100 operates in handling a telephone call from calling party 500 to called party 540 with reference to FIG. 3. At point 200, ABS 100 is waiting for a request for service from a calling party over the PSTN. Such requests, as is well known to those of ordinary skill in the art, are typically made in the form of the application of a ringing signal in an analog interface to the PSTN or in the form of a signalling bit transition in a digital interface to the PSTN. Such requests are received, detected and decoded by NLI 40, see decision box 205. For example, NLI 40 may detect an incoming telephone call from a calling party customer by detecting loop current in a telephone line accessed by the calling party customer and by transmitting a message regarding the detection event to controller 80. NLI 40 transmits a message that a request for service has been detected to controller 80 over lines 85. At point 210, after receiving the message from NLI 40 that a request for service has been detected, controller 80 sends a command to CSM 50 over lines 45 to connect a voice and data processing circuit in VDPM 70 to the circuit in NLI 40 which has the request pending. Then, controller 80 sends a command to NLI 40 over lines 85 to cause it to acknowledge the request for service. Such acknowledgement, as is well known in the art, generally takes the form of an "off hook" signal presented to the PSTN in an analog interface or such acknowledgement, as is well known in the art, generally takes the form of a momentary application of a signalling bit toward the PSTN in a digital interface.

As shown at point 220, VDPM 70 receives and decodes network routing and/or origination information signals that are sent from the PSTN. As is well known in the art, such network routing and/or origination information signals can take the form of dial pulse digits, dual tone multi-frequency (DTMF) digits, multi-frequency (MF) digits or common channel signalling. Such network routing and/or origination information signals will typically be present in DID (Direct-Inward-Dial), DNIS (Dialed-Number-Identification-Service), ANI (Automatic-Number-Identification) or ISDN (Integrated Services Digital Network) networks and are used, as is well known to those of ordinary skill in the art, to automatically identify the destination path for the call, the intended purpose for the call, and/or addressing information concerning the calling party. Alternatively, in the second type of embodiments discussed above wherein ABS 100 has to prompt the calling party to provide the address, i.e., the telephone number of the called party, VDPM 70 can be commanded by controller 80, in a manner well known to those of ordinary skill in the art, to output a voice message —prepared by the ABS provider in accordance with methods well known in the art—to prompt the calling party. The calling party, in response to the automated prompt, will manually enter a DTMF signal using, for example, the dialing pad on his telephone, to identify the called party. The DTMF will then be received and decoded by VDPM 70 and a message will then be transmitted to controller 80 over lines 95. The "state control" for such dialogues can reside, as is well known to those of ordinary skill in the art, within controller 80 and can be exercised from a combination of CPU 81, memory 82 and a data base or the "state control" can reside in a host computer (not shown) and be communicated to controller 80 by means of optional communications interface 90. It should be understood that inventive ABS 100 is not restricted to customers that can only transmit DTMF. In fact, ABS 100 may include within VDPM 70 speech recognition (SR) equipments which are well known to those of ordinary skill in the art for receiving spoken user responses and for converting such spoken responses into commands or input data which is in a form that is compatible for computer use. In such a case, the dialogue between the calling party and ABS 100 is accomplished by a dialogue wherein ABS 100 transmits voice prompts to the calling party and the calling party responds in normal speech. Such a system for carrying out dialogues by means of DTMF and/or SR has been disclosed in a patent application which is commonly assigned with this application, is entitled "Interactive Voice Processing With Speech Recognition," was filed Feb. 26, 1988, and has Ser. No. 160,820, which application is now abandoned.

As shown at point 230, controller 80, in conjunction with VDPM 70, has collected the called party's telephone number. If controller 80 is comprised of a local data base, it will store a predetermined set of data in the local data base using at least a portion of the ANI information as a retrieval key. If however, controller 80 is not comprised of a local data base, controller 80 may communicate with a remote data base in a host computer (not shown) via communications interface 90 and transmit at least a portion of the ANI information thereto.

At point 240, controller 80 commands CSM 50 to connect an available voice and data processing circuit from VDPM 70 to an available channel in NLI 60—in this embodiment this advantageously permits VDPM 70 to perform the signalling. At point 250, controller 80 sends a command to NLI 60 over lines 75 to make a request for service to the PSTN. For example, as is well known to those of ordinary skill in the art, such a request for service may comprise, for example, a contact closure or a signalling bit state transition. As shown at point 260, NLI 60 waits to receive acknowledgement of its request for service from the PSTN by, for example, dial tone or a signalling bit transition.

At point 270, after NLI 60 receives acknowledgement of its request for service and transmits that information to controller 80, controller 80 commands VDPM 70 to transmit the called party's telephone number over the path selected by CSM 50 towards NLI 60.

At point 280, controller 80 commands CSM 50 to disconnect any circuits in VDPM 70 which are connected to either the NLI 40 circuit or the NLI 60 circuit and to connect the calling party interfaced with NLI 40 to the PSTN interfaced with NLI 60. This provides a full connection or communications path between the calling party and the called party.

However, and perhaps most important, if the PSTN inserts any ANI for the telephone call made by ABS 100 to called party 540, such information corresponds to the ANI of ABS 100 and not the ANI for the calling party.

As shown at point 290, this communications path remains intact until NLI 40 detects a disconnect signal from the PSTN indicating that the calling party has hung up or until NLI 60 detects a disconnect signal from the PSTN indicating that the called party has hung up.

As shown at point 300, controller 80 commands CSM 50 to remove the connection between NLI 40 and NLI 60 and commands NLI 40 and NLI 60 to signal appropriate disconnects with the PSTN by, for example, presenting "on hook" signals thereto. Optionally, the transaction is logged at point 310 and the operation continues at point 200. For example, such logging may include updating a local data base or updating a remote data base by transmitting transaction information thereto over communications interface 90. Such transaction information may include, without limitation, network routing and/or origination information, a predetermined set of the initially retrieved data, called party information, call duration and so forth.

Note that the embodiment of the inventive ABS disclosed above takes advantage of a time-division-multiplex which is contained in the DTI/124 commercially available apparatus which may be used to embody CSM 50. However, the inventive ABS may also be implemented when one uses an equal number of NLI circuits and VDPM circuits. In such embodiments there may be no need for a switching means because the various resources can be connected together on a one-to-one basis. In particular, a TDM switching capability of the DTI/124 need not be used, and circuits in NLI 40 are connected to circuits in NLI 60 via an expansion bus in the DTI/124.

Further, those skilled in the art recognize that further embodiments of the present invention may be made without departing from its teachings For example, the inventive ABS can be used with any application that requires an interface with a multiplicity of users and is not restricted to analog or digital interfaces over telephone lines.

What is claimed is:

1. Apparatus, whose use in a telephone network which automatically transmits calling party identification and called party identification and which offers a blocking service by transferring a telephone call from a calling party which utilizes the blocking service, along with the calling and called party identifications, over the telephone network to the apparatus, causes blocking of the automatic transmittal of the calling party identification by the telephone network from the calling party's central office to a called party, the apparatus comprising:

one or more network line interfaces, any one of which may be used for receiving the telephone call from the calling party which was transferred over the telephone network in response to commands from a controller means;

one or more network line interfaces, any one of which may be used for placing a call to the called party over the telephone network utilizing the called party identification in response to commands from the controller means;

one or more voice and data processing means, any one of which may be switchably interconnected to one of the receiving one or more network line interfaces and to one of the placing one or more network line interfaces: (a) for obtaining the called party identification transmitted by the telephone network, (b) for transmitting the called party identification to the controller means, and (c) for transmitting signals to the one of the placing one or more network line interfaces or to the one of the receiving one or more network line interfaces, all in response to commands and information sent thereto from the controller means;

a connection and switching means for connecting and switching one of the receiving one or more network line interfaces to either one of the one or more voice and data processing means or to one of the placing one or more network line interfaces;

wherein the controller means comprises means which causes the apparatus: (a) to receive the transferred call from the calling party at one of the receiving one or more network line interfaces and to obtain the called party identification by interaction with the one of the receiving one or more network line interfaces, one of the one or more voice and data processing means and the connection and switching means; (b) to place a call to the called party by interaction with one of the placing one or more network line interfaces, one of the one or more voice and data processing means, and the connection and switching means; (c) to connect the calling party and the called party by interaction with the one of the receiving one or more network line interfaces, the one of the placing one or more network line interfaces, and the connection and switching means —whereby the automatic transmittal of the calling party identification by the telephone network to the called party is blocked; (d) to detect whether the calling party or the called party has gone on-hook by interaction with the one of the receiving one or more network line interfaces and the one of the placing one or more network line interfaces; and (e) to terminate the call between the calling party and the called party when either the calling party or the called party has gone on-hook by interaction with the one of the receiving one or more network line interfaces, the one of the placing one or more network line interfaces, and the connection and switching means.

2. The apparatus of claim 1 wherein the controller means further comprises means for obtaining the calling party identification transmitted by the telephone network by interaction with the one of the receiving one or more network line interfaces, one of the one or more voice and data processing means and the connection and switching means and wherein the controller means further comprises communications means for transmitting at least a portion of the calling party identification and called party identification to remote apparatus.

3. The apparatus of claim 2 wherein the controller means further comprises means which utilizes the communications means for sending information pertaining to the telephone interaction between the called party and the calling party to a remote data base.

4. The apparatus of claim 1 wherein the controller means further comprises a local data base for retrieving and storing information.

5. Apparatus, whose use in a telephone network which automatically transmits calling party identification and called party identification and which offers a blocking service by transferring a telephone call from a calling party which utilizes the blocking service, along with the calling and called party identifications, over the telephone network to the apparatus, causes blocking of the automatic transmittal of the calling party identification by the telephone network from the calling party's central office to a called party, the apparatus comprising:

one or more network line interfaces, any one of which may be used for receiving the telephone call from the calling party which was transferred over the telephone network in response to commands from a controller means;

one or more network line interfaces, any one of which may be used for placing a call to the called party over the telephone network utilizing the called party identification in response to commands from the controller means;

one or more voice and data processing means, any one of which may be interconnected to one of the receiving one or more network line interfaces and to one of the placing one or more network line interfaces: (a) for obtaining the called party identification transmitted by the telephone network, (b) for transmitting the called party identification to the controller means, and (c) for transmitting signals to the one of the placing one or more network line interfaces or to the one of the receiving one or more network line interfaces, all in response to commands and information sent thereto from the controller means;

a connection means for connecting one of the receiving one or more network line interfaces to either one of the one or more voice and data processing means or to one of the placing one or more network line interfaces;

wherein the controller means comprises means which causes the apparatus: (a) to receive the transferred call from the calling party to one of the receiving one or more network line interfaces and to obtain the called party identification by interaction with the one of the receiving one or more network line interfaces, one of the one or more voice and data processing means and the connection means; (b) to place a call to the called party by interaction with one of the placing one or more network line interfaces, one of the one or more voice and data processing means, and the connection means; (c) to connect the calling party and the called party by interaction with the one of the receiving one or more network line interfaces, the one of the placing one or more network line interfaces, and the connection means—whereby the automatic transmittal of the calling party identification by the telephone network to the called party is blocked; (d) to detect whether the calling party or the called party has gone on-hook by interaction with the one of the receiving one or more network line interfaces and the one of the placing one or more network line interfaces; and (e) to terminate the call between the calling party and the called party when either the calling party or the called party has gone on-hook by interaction with the one of the receiving one or more network line interfaces, the one of the placing one or more network line interfaces, and the connection means.

6. The apparatus of claim 5 wherein the controller means further comprises means for obtaining the calling party identification transmitted by the telephone network by interaction with the one of the receiving one or more network line interfaces, one of the one or more voice and data processing means, and the connection means and wherein the controller means further comprises communications means for transmitting at least a portion of the calling party identification and called party identification to remote apparatus.

7. The apparatus of claim 6 wherein the controller means further comprises means which utilizes the communications means for sending information pertaining to the telephone interaction between the called party and the calling party to a remote data base.

8. The apparatus of claim 1 wherein at least one of the receiving one or more network line interfaces receives calls in digital form.

9. The apparatus of claim 1 wherein at least one of the receiving one or more network line interfaces receives calls in analog form.

10. The apparatus of claim 1 wherein at least one of the placing one or more network line interfaces places calls in digital form.

11. The apparatus of claim 1 wherein at least one of the placing one or more network line interfaces places calls in analog form.

12. The apparatus of claim 1 wherein the connection and switching means connects and switches in digital form.

13. The apparatus of claim 1 wherein the connection and switching means connects and switches in analog form.

14. The apparatus of claim 5 wherein at least one of the receiving one or more network line interfaces receives calls in digital form.

15. The apparatus of claim 5 wherein at least one of the receiving one or more network line interfaces receives calls in analog form.

16. The apparatus of claim 5 wherein at least one of the placing one or more network line interfaces places calls in digital form.

17. The apparatus of claim 5 wherein at least one of the placing one or more network line interfaces places calls in analog form.

18. A method for blocking automatic transmittal of calling party identification from a calling party's central office to a called party by a telephone network, which telephone network automatically transmits calling party identification, the blocking being effected by having the telephone network transmit an identification other than that of the calling party to the called party, which telephone network offers a blocking service by transferring a telephone call from the calling party which utilizes the blocking service, along with a called party telephone number supplied to the telephone network by the calling party, to apparatus associated with another telephone number other than the calling party identification, the method comprising the steps of:

receiving, at the apparatus associated with the another telephone number, the telephone call from the calling party which was transferred thereto by the telephone network;

obtaining the called party telephone number transferred by the telephone network;

placing a new telephone call to the called party over the telephone network utilizing the called party telephone number, the new telephone call being placed in such a manner that the telephone network utilizes the another telephone number as a new calling party identification which is associated with the new telephone call, the telephone network transmitting the new calling party identification to the called party;

connecting the calling party and the called party;

detecting whether the calling party or the called party has gone on-hook; and terminating the connection between the calling party and the called party when either the calling party or the called party has gone on-hook.

19. A method for blocking automatic transmittal of calling party identification from a calling party's central office to a called party by a telephone network, which telephone network automatically transmits calling party identification, the blocking being effected by having the telephone network transmit an identification other than that of the calling party to the called party, the method comprising the steps of:

receiving a telephone call through the telephone network from the calling party at apparatus associated with a telephone number other than the calling party identification;

prompting the calling party to transmit a called party telephone number and receiving the called party telephone number;

placing a telephone call to the called party over the telephone network utilizing the called party telephone number, the telephone call to the called party being placed in such a manner that the telephone network utilizes the other telephone number as a new calling party identification which is associated with the telephone call to the called party, the telephone network transmitting the new calling party identification to the called party;

connecting the calling party and the called party whereby the automatic transmittal of the calling party identification by the telephone network to the called party is blocked;

detecting whether the calling party or the called party has gone on-hook; and terminating the connection between the calling party and the called party when either the calling party or the called party has gone on-hook.

20. Apparatus for blocking automatic transmittal of calling party identification from a calling party's central office to a called party by a telephone network, which telephone network automatically transmits calling party identification, which apparatus comprises:

one or more network line interfaces, any one of which of which may be used for receiving a telephone call through the telephone network from the calling party in response to commands from a controller means;

one or more network line interfaces, any one of which may be used for placing a call to the called party over the telephone network utilizing called party identification in response to commands from the controller means;

one or more voice and data processing means, any one of which may be switchably interconnected to one of the receiving one or more network line interfaces and to one of the placing one or more network line interfaces: (a) for obtaining the called party identification from the calling party during a dialogue, (b) for transmitting the called party identification to the controller means, and (c) for transmitting signals to the one of the placing one or more network line interfaces or to the one of the receiving one or more network line interfaces, all in response to commands and information sent thereto from the controller means;

a connection and switching means for connecting and switching one of the receiving one or more network line interfaces to either one of the one or more voice and data processing means or to one of the placing one or more network line interfaces;

wherein the controller means comprises means which causes the apparatus: (a) to receive the call from the calling party at one of the receiving one or more network line interfaces and to obtain the called party identification from the calling party during a dialogue by interaction with the one of the receiving one or more network line interfaces, one of the one or more voice and data processing means and the connection and switching means; (b) to place a call to the called party by interaction with one of the placing one or more network line interfaces, one of the one or more voice and data processing means, and the connection and switching means; (c) to connect the calling party and the called party by interaction with the one of the receiving one or more network line interfaces, the one of the placing one or more network line interfaces, and the connection and switching means— whereby the automatic transmittal of the calling party identification by the telephone network to the called party is blocked; (d) to detect whether the calling party or the called party has gone on-hook by interaction with the one of the receiving one or more network line interfaces and the one of the placing one or more network line interfaces; and (e) to terminate the call between the calling party and the called party when either the calling party or the called party has gone on-hook by interaction with the one of the receiving one or more network line interfaces, the one of the placing one or more network line interfaces, and the connection and switching means.

21. Apparatus for blocking automatic transmittal of calling party identification from a calling party's central office to a called party by a telephone network, which telephone network automatically transmits calling party identification, which apparatus comprises:

one or more network line interfaces, any one of which of which may be used for receiving a telephone call through the telephone network from the calling party in response to commands from a controller means;

one or more network line interfaces, any one of which may be used for placing a call to the called party over the telephone network utilizing called party identification in response to commands from the controller means;

one or more voice and data processing means, any one of which may be interconnected to one of the receiving one or more network line interfaces and to one of the placing one or more network line interfaces: (a) for obtaining the called party identification from the calling party during a dialogue, (b) for transmitting the called party identification to the controller means, and (c) for transmitting signals to the one of the placing one or more network line interfaces or to the one of the receiving one or more network line interfaces, all in response to commands and information sent thereto from the controller means;

a connection means for connecting one of the receiving one or more network line interfaces to either one of the one or more voice and data processing means or to one of the placing one or more network line interfaces;

wherein the controller means comprises means which causes the apparatus: (a) to receive the call from the calling party at one of the receiving one or more network line interfaces and to obtain the called party identification from the calling party during a dialogue by interaction with the one of the receiving one or more network line interfaces, one of the one or more voice and data processing means and the connection means; (b) to place a call to the called party by interaction with one of the placing one or more network line interfaces, one of the one or more voice and data processing means, and the connection means; (c) to connect the calling party and the called party by interaction with the one of the receiving one or more network line interfaces, the one of the placing one or more network line interfaces, and the connection means —whereby the automatic transmittal of the calling party identification by the telephone network to the called party is blocked; (d) to detect whether the calling party or the called party has gone on-hook by interaction with the one of the receiving one or more network line interfaces and the one of the placing one or more network line interfaces; and (e) to terminate the call between the calling party and the called party when either the calling party or the called party has gone on-hook by interaction with the one of the receiving one or more network line interfaces, the one of the placing one or more network line interfaces, and the connection means.

* * * * *